(12) United States Patent
Jin et al.

(10) Patent No.: US 10,656,430 B2
(45) Date of Patent: May 19, 2020

(54) STEREOSCOPIC DISPLAY DEVICE HAVING A BARRIER PANEL

(71) Applicant: LG Display Co., Ltd., Seoul (KR)

(72) Inventors: You-Yong Jin, Seoul (KR); Hoon Kang, Goyang-si (KR); Byung-Joo Lee, Seoul (KR); Bu-Yeol Lee, Goyang-si (KR); Wook Jeon, Daejeon (KR); Hee-Jin Im, Paju-si (KR); Yong-Ku Lee, Gimpo-si (KR); Ju-Hoon Jang, Paju-si (KR); Dong-Yeon Kim, Seoul (KR); Woon-Chan Moon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 66 days.

(21) Appl. No.: 15/955,507

(22) Filed: Apr. 17, 2018

(65) Prior Publication Data

US 2018/0299685 A1 Oct. 18, 2018

(30) Foreign Application Priority Data

Apr. 18, 2017 (KR) .................. 10-2017-0050033

(51) Int. Cl.
*G02B 27/22* (2018.01)
*G02F 1/13* (2006.01)
*H04N 13/31* (2018.01)
*G02B 27/26* (2006.01)
*H04N 13/315* (2018.01)
*H04N 13/373* (2018.01)

(52) U.S. Cl.
CPC ....... *G02B 27/2214* (2013.01); *G02B 27/225* (2013.01); *G02B 27/26* (2013.01); *G02F 1/13* (2013.01); *H04N 13/31* (2018.05); *H04N 13/315* (2018.05); *H04N 13/373* (2018.05)

(58) Field of Classification Search
CPC .................. G02B 27/2214; G02B 27/0093
USPC ...................... 359/462, 464; 348/53, 54
See application file for complete search history.

(56) References Cited

U.S. PATENT DOCUMENTS

| 8,817,369 | B2 * | 8/2014 | Daiku | ............... G02B 27/0093 359/464 |
| 9,706,192 | B2 * | 7/2017 | Watanabe | .......... G02B 27/2214 |
| 2018/0205942 | A1 * | 7/2018 | Smith | ............... G02B 27/2214 |

FOREIGN PATENT DOCUMENTS

| CN | 103135280 A | 6/2013 |
| KR | 20150026029 A | 3/2015 |
| WO | 2017/010104 A1 | 1/2017 |

* cited by examiner

*Primary Examiner* — Audrey Y Chang
(74) *Attorney, Agent, or Firm* — Seed Intellectual Property Law Group LLP

(57) ABSTRACT

A stereoscopic display device including a barrier panel is provided. When a viewing distance of a viewer is out of the proper range, the stereoscopic display device may shift the blocking regions and the transmitting regions of the barrier panel. The stereoscopic display device may maintain the ratio of channels located within a barrier blocking region and a barrier transmitting region of the barrier panel by using the channels disposed within trigger regions of the barrier panel. Thus, the stereoscopic display device may provide a stereoscopic image of good quality to the viewer located at a region being out of the proper range.

20 Claims, 15 Drawing Sheets

100 800 710  200 720

200

220  210

200

220  210

900 710 200 720 100 730

900 740 100 710 200 720

STEREOSCOPIC DISPLAY DEVICE HAVING A BARRIER PANEL

CROSS-REFERENCE TO RELATED APPLICATIONS

This application claims the priority benefit of Korean Patent Application No. 10-2017-0050033, filed Apr. 18, 2017, which is hereby incorporated by reference as if fully set forth herein.

BACKGROUND

Technical Field

The present disclosure relates to a stereoscopic display device including a barrier panel having blocking regions and transmitting regions.

Description of the Related Art

Generally, a display device includes a display panel for realizing an image. For example, the display module may include a liquid crystal panel having a liquid crystal, and an OLED panel having an organic light-emitting element.

The display device may realize a stereoscopic image using the position difference of two eyes. For example, a stereoscopic display device realizing the stereoscopic image may provide different images to the left eye and the right eye of a viewer by using the difference of images due to the position difference of the two eyes, that is, the binocular disparity.

The stereoscopic display device includes an eyeglasses type using a shutter and a non-glasses type using a barrier panel. The barrier panel may separate the image realized by the display panel, and provide it to the viewer's left eye or right eye. For example, the barrier panel may form a path difference of light by individually or region-by-region adjusting voltage applied to the channels disposed at regular intervals. The barrier panel may include blocking regions and transmitting regions formed by the applied voltage. The blocking regions are located between the transmitting regions. For example, the barrier panel may include a liquid crystal disposed between a lower barrier substrate and an upper barrier substrate.

In the stereoscopic display device, the location of the blocking regions and the transmitting regions may be determined according to a set viewing distance. For example, when the viewing distance of the viewer is out of the proper range, the stereoscopic display device may move the blocking regions and the transmitting regions of the barrier panel for providing a stereoscopic image of good quality to the viewer located at a region being out of the proper range.

However, in the stereoscopic display device, a size of some blocking region or some transmitting region may be changed by movement of the blocking regions and the transmitting regions of the barrier panel. The blocking region and the transmitting region having the changed size may be recognized by the viewer as a bright line or a dark line. Thus, in the stereoscopic display device, the quality of the image provided the viewer located at a region being out of the proper range may be degraded.

BRIEF SUMMARY

Accordingly, the present disclosure is directed to a display device that substantially obviates one or more problems due to limitations and disadvantages of the related art.

An object of the present disclosure is to provide a stereoscopic display device capable of providing a stereoscopic image of good quality to the viewer located at a region being out of the proper range.

Another object of the present disclosure is to provide a stereoscopic display device in which a bright line and a dark line due to movement of the blocking regions and the transmitting regions of the barrier panel are prevented.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a stereoscopic display device including a display driver driving a display panel. A barrier panel is located on the display panel. The barrier panel includes a plurality of channels. The channels of the barrier panel are controlled by a barrier driver. The barrier panel includes barrier regions and trigger regions. The trigger regions are disposed between the barrier regions. A viewing distance of a viewer is detected by a viewing distance detector. When the viewing distance of the viewer is out of the proper range, a pair of the trigger regions symmetrical with respect to the center of the barrier panel includes channels having intermediate gray value.

A size of each trigger region may be smaller than a size of each barrier region.

Each of the barrier regions may include a barrier blocking region and a barrier transmitting region. The number of the channels within the barrier blocking region may be same as the number of the channels within the barrier transmitting region.

The intermediate gray value may be a gray value between a gray value of the barrier blocking region and a gray value of the barrier transmitting region.

The number of the channels within each trigger region may be a half of the number of the channels within each barrier region.

Each of the trigger regions may include a trigger blocking region and a trigger transmitting region. The number of the channels within the trigger blocking region may be same as the number of the channels within the trigger transmitting region.

The trigger blocking region of each trigger region may be in contact with the barrier blocking region of adjacent barrier region. The trigger transmitting region of each trigger region may be in contact with the barrier transmitting region of adjacent barrier region.

The channel having the intermediate gray value may be disposed between the trigger blocking region and the trigger transmitting region.

The trigger regions may be disposed side by side with the barrier regions.

The display panel may include a lower display substrate, a lower light-emitting electrode, a light-emitting layer, an upper light-emitting electrode and an upper display substrate, which are sequentially stacked.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
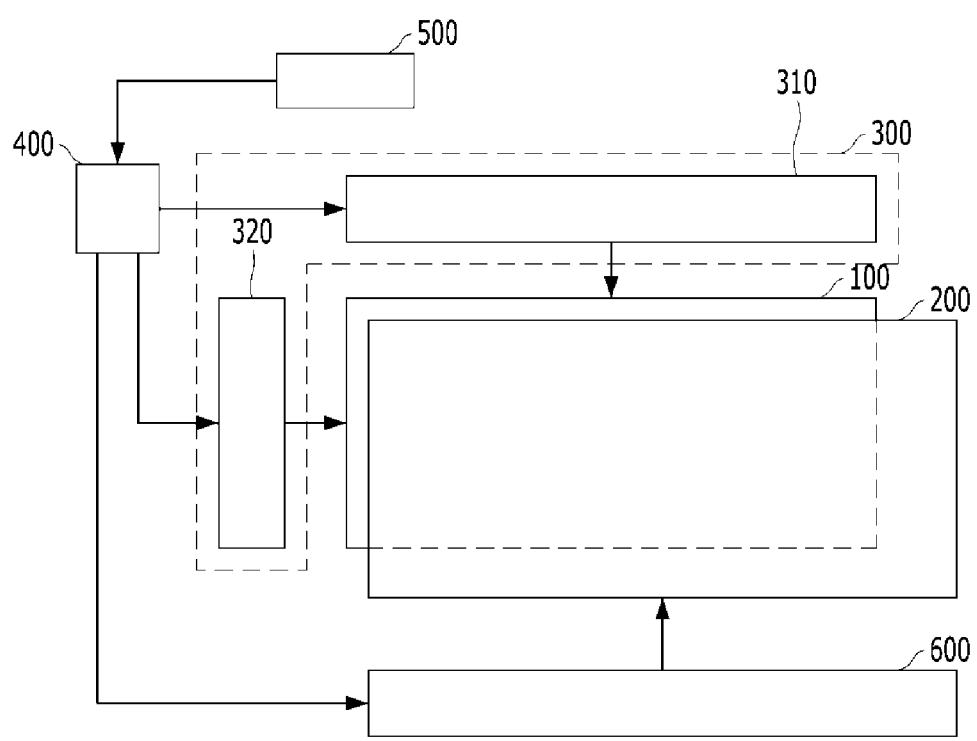
FIG. 1 is a view schematically showing a stereoscopic display device according to an embodiment of the present disclosure.

Hereinafter, details related to the above objects, technical configurations, and operational effects of the embodiments of the present disclosure will be clearly understood by the following detailed description with reference to the drawings, which illustrate some embodiments of the present disclosure. Here, the embodiments of the present disclosure are provided in order to allow the technical spirit of the present disclosure to be satisfactorily transferred to those skilled in the art, and thus the present disclosure may be embodied in other forms and is not limited to the embodiments described below.

In addition, the same or extremely similar elements may be designated by the same reference numerals throughout the specification, and in the drawings, the lengths and thickness of layers and regions may be exaggerated for convenience. It will be understood that, when a first element is referred to as being "on" a second element, although the first element may be disposed on the second element so as to come into contact with the second element, a third element may be interposed between the first element and the second element.

Here, terms such as, for example, "first" and "second" may be used to distinguish any one element with another element. However, the naming of an element as a first element or second element is done for clarity and the convenience of those skilled in the art to identify particular parts and does not limit the disclosure or claims and does not depart from the technical spirit of the present disclosure.

The terms used in the specification of the present disclosure are merely used in order to describe particular embodiments, and are not intended to limit the scope of the present disclosure. For example, an element described in the singular form is intended to include a plurality of elements unless the context clearly indicates otherwise. In addition, in the specification of the present disclosure, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

(Embodiment)

Figure 2A:
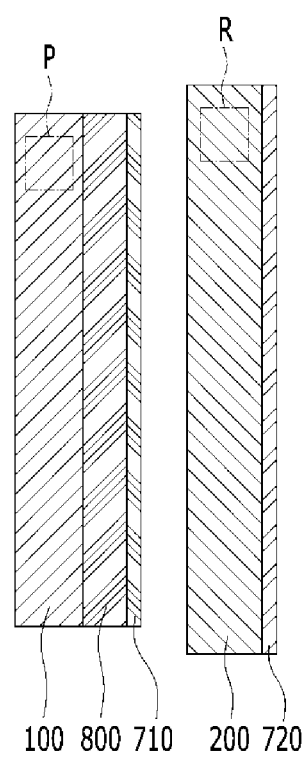
FIG. 2A is a view showing a cross-section of a display panel and a barrier panel of the stereoscopic display device according to the embodiment of the present disclosure.
Figure 2B:
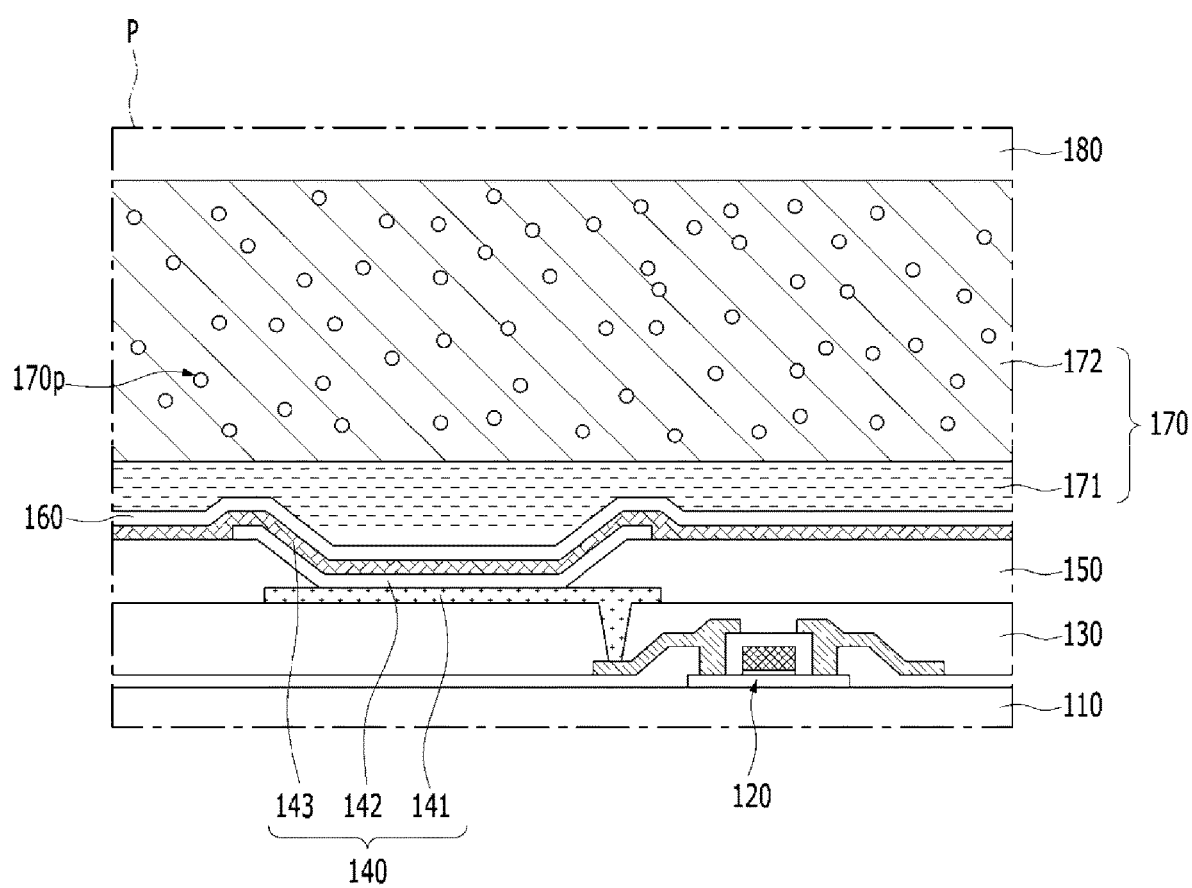
FIG. 2B is an enlarged view of region P in FIG. 2A.
Figure 2C:
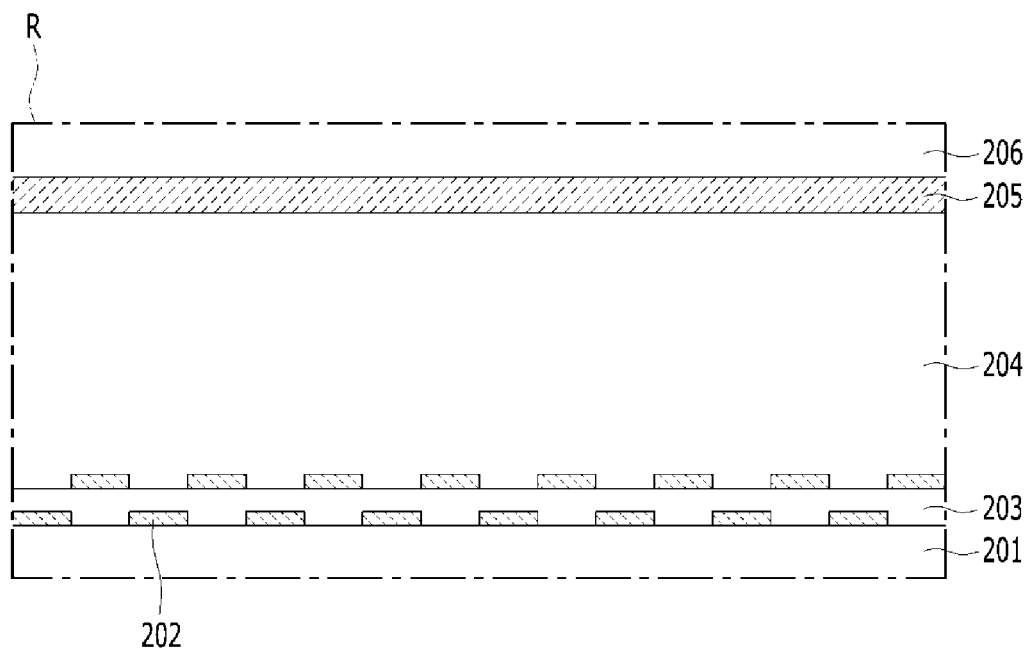
FIG. 2C is an enlarged view of region R in FIG. 2A.

FIG. 1 is a view schematically showing a stereoscopic display device according to an embodiment of the present disclosure. FIG. 2A is a view showing a cross-section of a display panel and a barrier panel of the stereoscopic display device according to the embodiment of the present disclosure. FIG. 2B is an enlarged view of region P in FIG. 2A. FIG. 2C is an enlarged view of region R in FIG. 2A.

Referring to FIGS. 1 and 2A to 2C, the stereoscopic display device according to the embodiment of the present disclosure may include a display panel 100, a barrier panel 200, a display driver 300, a timing controller 400, a viewing distance detector 500 and a barrier driver 600.

The display panel 100 may realize an image provided to the viewer. For example, the display panel 100 may include a lower display substrate 110, a light-emitting element 140 and an upper display substrate 180, which are sequentially stacked. The display panel 100 may realize the image using the light generated by the light-emitting element 140. For example, the light-emitting element 140 may include a lower light-emitting electrode 141, a light-emitting layer 142 and an upper light-emitting electrode 143, which are sequentially stacked. The light-emitting layer 142 may include an organic light-emitting material or an inorganic light-emitting material. For example, the display panel 100 of the stereoscopic display device according to the embodiment of the present disclosure may be an OLED panel including an organic light-emitting element.

The display panel 100 may further include a thin film transistor 120 between the lower display substrate 110 and the light-emitting element 140, an interlayer insulating layer 130 covering the thin film transistor 120, and a bank insulating layer 150 covering an edge of the lower light-emitting electrode 141. The light-emitting element 140 may be electrically connected to the interlayer insulating layer 130. The lower light-emitting electrode 141 may be electrically connected to the thin film transistor 120. For example, the interlayer insulating layer 130 may include a contact hole for connecting the lower light-emitting electrode 141 to the thin film transistor 120.

The display panel 100 may further include an upper passivation layer 160 between the light-emitting element 140 and the upper display substrate 180, and an adhesive layer 170 between the upper passivation layer 160 and the upper display substrate 180. The upper display substrate 180 may be coupled to the lower display substrate in which the light-emitting element 140 is formed by the adhesive layer 170. The upper passivation layer 160 and the adhesive layer 170 may prevent a damage of the light-emitting element 140 due to external impact. For example, the adhesive layer 170 may include a lower adhesive layer 171 and an upper adhesive layer 172. The upper adhesive layer 172 may be in direct contact with the lower adhesive layer 171 and the upper display substrate 180. The adhesive layer 170 may prevent permeating the external moisture to the light-emitting element 140. For example, the upper adhesive layer 172 may include the moisture absorbing material 170b.

The barrier panel 200 may be disposed on the display panel 100. The barrier panel 200 may separate the image realized by the display panel 100, and provide it to the viewer's left eye and right eye. For example, the image realized by the display panel 100 may be stereoscopically recognized to the viewer by the barrier panel 200.

The barrier panel 200 may selectively transmit or block the light. For example, the barrier panel 200 may include a lower barrier substrate 201, channels 202, a liquid crystal layer 204, a common electrode 205 and an upper barrier substrate 206, which are sequentially stacked. The liquid crystal layer 204 may include TN mode or ECB mode liquid crystal. The channels 202 may have a multi-layer structure insulated by an insulating layer 203.

The stereoscopic display device according to the embodiment of the present disclosure may further comprise a front linear polarizer 710 disposed between the display panel 100 and the barrier panel 200, and a rear linear polarizer 720 located on an outer surface of the barrier panel 200. The rear linear polarizer 720 may include a transmission axis orthogonal with the front linear polarizer 710. The rear linear polarizer 720 may be in direct contact with the barrier panel 200.

The barrier panel 200 may transmit or block the light according to the voltage applied to the channel 202. For example, the stereoscopic display device according to the embodiment of the present disclosure may be a normally white mode in which the liquid crystal layer 204 located on the voltage-applied channel 202 is driven to block the light.

Figure 3:
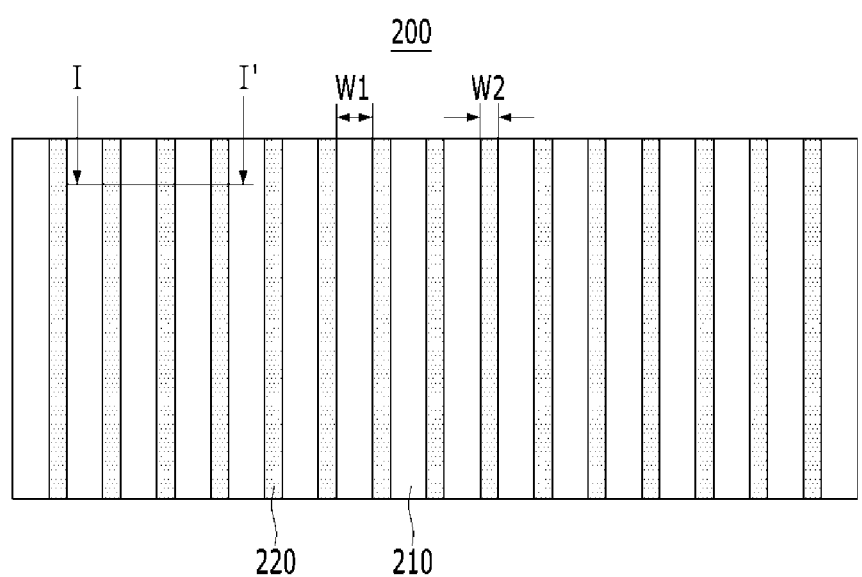
FIG. 3 is a view showing a surface of the barrier panel of the stereoscopic display device according to the embodiment of the present disclosure.

As shown in FIG. 3, the barrier panel 200 may include barrier regions 210 and trigger regions 220. The trigger regions 220 may be disposed between the barrier regions 210. The trigger regions 220 may be located side-by-side with the barrier regions 210. For example, the trigger regions 220 may be disposed symmetrically with respect to the center of the barrier panel 200. The barrier regions 210 and the trigger regions 220 may be extended in a vertical direction.

A size of each trigger region 220 may be smaller than a size of each barrier region 210. The trigger regions 220 may have the same size. The barrier regions 210 may have the same size. For example, a width W1 of each barrier region 210 may be larger than a width W2 of each trigger region 220.

The display driver 300 may drive the display panel 100. The display panel 100 may receive signals for realizing the image from the display driver 300. For example, the display driver 300 may include a data driver 310 and a scan driver 320.

The data driver 310 may supply data signals to the display panel 100. The scan driver 320 may sequentially apply scan signals to the display panel 100. The data signals supplied by the data driver 310 may be synchronized with the scan signals applied by the scan driver 320.

The timing controller 400 may provide signal necessary for the operation of the display driver 300. For example, the timing controller 400 may provide a digital video data and a source timing controlling signal to the data driver 310. The scan driver 320 may receive a clock signal, a reset clock signal and a start signal from the timing controller 400.

The viewing distance detector 500 may sense a viewing distance of a viewer. For example, the viewing distance detector 500 may detect location information of the viewer viewing the image realized by the display panel 100 and the barrier panel 200. The viewing distance detector 500 may include a camera. In one example, the camera may have a range finder circuit and sensor of a type known in the art to detect and determine the exact range of people's faces from the camera and thus also the distance from the display. In another example, the viewing distance detector 500 may work with a remote control that is controlling the program being viewed on the display. When the remote control is used to change the channel, the display can determine the exact distance between the remote control and display using known signal transmission technology. Since the user has just changed the program to a new program, In this example, the user will be expected to be holding the remote control and this will provide information of the distance the user is from the display. Other techniques might be used to determine the distance of the user, and in particular, the users face, from the display to determine the that distance.

FIGS. 4A to 4D are views respectively showing a cross-section taken along I-I' of FIG. 3. Also, each of FIGS. 4A to 4D shows a gradation change of the channels located within the barrier regions 210 and the trigger regions 220 of the barrier panel, when the viewer moves gradually closer to the display panel 100 from a region having a viewing distance of the proper range. The cross-section I-I' is taken along just one side of the display and a corresponding change will be made in the barrier panel at a symmetrical location on the other side of the display, thus, a pair of grey areas will per present, one on each side of the barrier panel, even though only one side of the barrier is shown in FIGS. 4A-4D and 5A-5D.

Figure 4A:
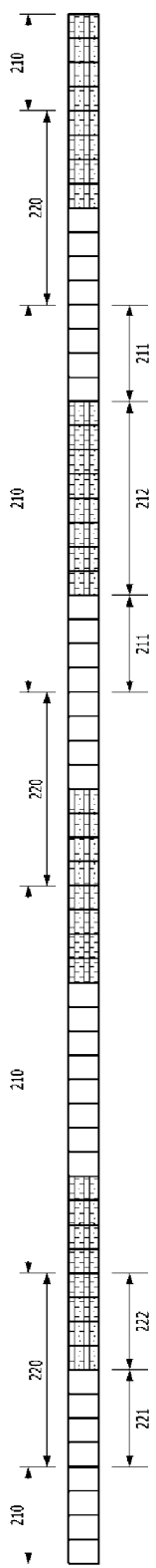
FIGS. 4A to 4D and 5A to 5D are views showing a gradation change of the channels according to the viewing distance.

Referring FIGS. 4A to 4D, it will describe that the gradation of the channels are changed according to the location of the viewer. First, when the viewer is located within a region having a viewing distance of the proper range, as shown in FIG. 4A, the barrier region 210 and the trigger regions 220 may have a transmitting region 211 and 221, and a blocking region 212 and 222, respectively.

Each of the barrier regions 210 may include a barrier transmitting region 211 and a barrier blocking region 212. The number of the channels within the barrier transmitting region 211 may be same as the number of the channels within the barrier blocking region 212 of the corresponding barrier region 210. For example, the barrier transmitting region 211 and the barrier blocking region 212 may have eight channels, respectively. Each of the barrier regions 210 may include 16 channels.

The location of the barrier transmitting region 211 and the barrier blocking region 212 may be reversed in adjacent barrier regions 210. In each of barrier regions 210, the channels consisting of the barrier transmitting region 211 or the channels consisting of the barrier blocking region 212 may be not continuous. Each of the barrier regions 210 may include the barrier transmitting region 211 located between the channels consisting of the barrier blocking region 212 and the barrier blocking region 212 located between the channels consisting of the barrier transmitting region 211. For example, each of the barrier regions 210 may include four channels for configuring the barrier blocking region 212 on both sides of the barrier transmitting region 211, or four channels for configuring the barrier transmitting region 211 on both sides of the barrier blocking region 212. The barrier regions 210 including the barrier transmitting region 211 between the channels consisting of the barrier blocking region 212 and the barrier regions 210 including the barrier blocking region 212 between the channels consisting of the barrier transmitting region 211 may be repeated.

Each of the trigger regions 220 may include a trigger transmitting region 221 and a trigger blocking region 222. The number of the channels within the trigger transmitting region 221 may be same as the number of the channel blocking region 222 of the corresponding trigger region 220. The number of the channels within each trigger region 220 may be smaller than the number of the channels within each barrier region 210. The number of the channels within the trigger region 220 may be a half of the number of the channels within the barrier region 210. For example, the trigger transmitting region 221 and the trigger blocking region 222 may have four channels, respectively.

The trigger transmitting region 221 of each trigger region 220 may be in direct contact with the barrier transmitting region 211 of adjacent barrier region 210. The gray value of the trigger transmitting region 221 may be same as the gray value of the barrier transmitting region 211. The barrier transmitting region 211 and the trigger transmitting region 221 adjacent to the barrier transmitting region 211 may consist of the transmitting region 211 and 221 of the barrier panel 200. The trigger blocking region 222 of each trigger region 220 may be in direct contact with the barrier blocking region 212 of adjacent barrier region 210. The gray value of the trigger blocking region 222 may be same as the gray value of the barrier blocking region 212. The trigger blocking region 222 and the barrier blocking region 212 adjacent to the trigger blocking region 222 may consist of the blocking region 212 and 222 of the barrier panel 200. Thus, in the barrier panel 200 of the stereoscopic display device according to the embodiment of the present disclosure, transmitting regions 211 and 221, and blocking regions 212 and 222 are regularly repeated, when the viewer is located within a region having the viewing distance of the proper range.

Figure 4B:
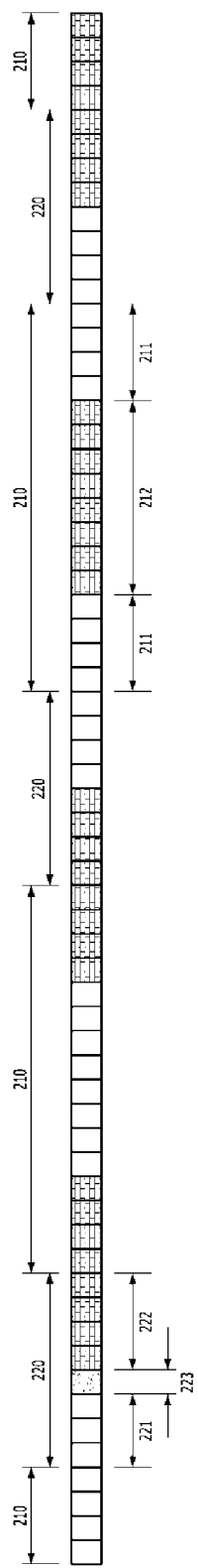

When the viewer is located closer than the region having the viewing distance of the proper range, the trigger region 220 farthest from the center of the barrier panel 200 may include a channel 223 having intermediate gray value, as shown in FIG. 4B.

In the trigger region 220 farthest from the center of the barrier panel 200, the number of the channels consisting of the trigger blocking region 222 may be smaller than the number of the channels consisting of the trigger transmitting region 221. For example, the trigger region 220 farthest from the center of the barrier panel 200 may include the trigger transmitting region 221 having three channels and the trigger blocking region 222 having four channels. Thus, in the stereoscopic display device according to the embodiment of the present disclosure, the transmitting region 211 and 221 farthest the center of the barrier panel may move toward the outside of the barrier panel, when the location of the viewer is closer than the region having the viewing distance of the proper range. When the transmitting region 211 and 221 of the barrier panel moves toward the outside of the barrier panel, the focus of the stereoscopic image provided to the viewer may be brought closer to the display panel. Therefore, in the stereoscopic display device according to the embodiment of the present disclosure, the transmitting region 211 and 221 of the barrier panel may move toward the outside of the barrier panel by locating some channel 223 having the intermediate gray value within the trigger region 220, so that the stereoscopic image of good quality may provide to the viewer being a first close distance that is closer than the region having the viewing distance of the proper range.

The channel 223 having the intermediate gray value is disposed between the trigger transmitting region 221 and the trigger blocking region 222 in the corresponding trigger region 220. Thus, in the stereoscopic display device according to the embodiment of the present disclosure, a boundary between the trigger transmitting region 221 and the trigger blocking region 222 having different numbers of the channels, for example a boundary between the trigger transmitting region 221 having three channels and the trigger blocking region 222 having four channels, may be blurredly recognized to the viewer. Thus, in the stereoscopic display device according to the embodiment of the present disclosure, it can be prevented that the change size of the transmitting region 211 and 221, or the blocking region 212 and 222 which are located adjacent, is recognized by the viewer closer than the region having the viewing distance of the proper range as a bright line or a dark line.

The stereoscopic display device according to the embodiment of the present disclosure only describes the trigger region 220 near the one side of the barrier panel. However, the trigger regions 220 positioned to be symmetrical with respect to the center of the barrier panel may be controlled in the same manner, substantially. For example, in the stereoscopic display device according to the embodiment of the present disclosure, when the viewer is located closer than the region having the viewing distance of the proper range, a pair of trigger regions 220 farthest from the center of the barrier panel may respectively include the channel 223 having the intermediate gray value, so that a pair of transmitting regions 211 and 221 farthest from the center of the barrier panel may move toward the corresponding outside of the barrier panel.

Figure 4C:
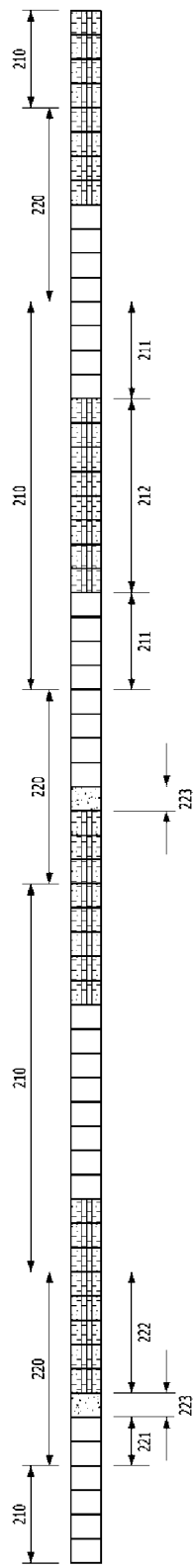

When the location of the viewer is at a second close distance, even closer than the first close distance and much closer than region having the viewing distance of the proper range, the trigger region 220 farthest from the center of the barrier panel and the trigger region 220 secondly far from the center of the barrier panel may include a channel 223 having the intermediate gray value, as shown in FIG. 4C.

The barrier transmitting region 211 of the barrier region 210 between two the trigger regions 220 including the channel 223 having the intermediate gray value, may move toward the outside of the barrier panel. That is, the barrier region 220 between two trigger regions 220 including the channel 223 having the intermediate gray value, may include the barrier transmitting region 221 having eight channels between the barrier blocking region 212 having three channels and the barrier blocking region 212 having five channels. Thus, in the stereoscopic display device according to the embodiment of the present disclosure, the transmitting region 211 and 221 farthest from the center of the barrier panel may move further the outside of the barrier panel. Thereby, in the stereoscopic display device according to the embodiment of the present disclosure, the focus of the stereoscopic image may be further brought closer to the display panel.

Figure 4D:
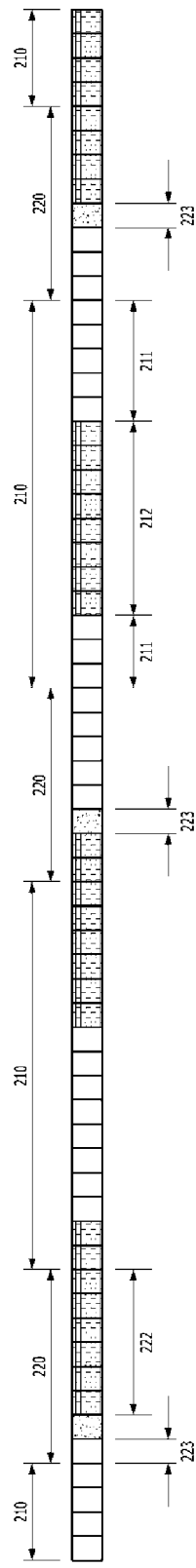

As shown in FIG. 4D, when the viewer is located even closer from the region having the viewing distance of the proper range, for example, at a third close distance. The second close distance is thus closer to the display than the first close distance and the third close distance is closer to the display than the second close distance. The trigger region 220 farthest from the center of the barrier panel, the trigger region 220 secondly far from the center of the barrier panel, and the trigger region 220 third far from the center of the barrier panel may include a channel 223 having the intermediate gray value. Thus, in the stereoscopic display device according to the embodiment of the present disclosure, the focus of the stereoscopic image may be brought even closer to the display panel by further moving the transmitting region 211 and 221 farthest from the center of the barrier panel toward the outside of the barrier panel.

FIGS. 5A to 5D are views respectively showing a cross-section taken along I-I' of FIG. 3. Also, each of FIGS. 5A to 5D shows a gradation change of the channels located within the barrier regions 210 and the trigger regions 220 of the barrier panel, when the viewer is gradually moving away from the region having the viewing distance of the proper range.

Figure 5A:
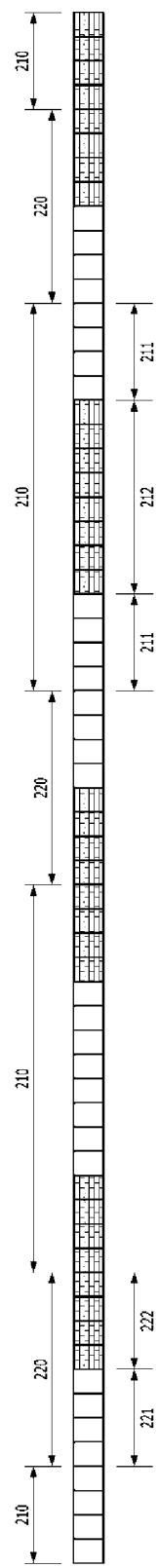

Referring FIGS. 5A to 5D, it will describe the gray value of the channels within the barrier regions 210 and the trigger regions 220, when the viewer moves away from the region having the viewing distance of the proper range. First, when the viewer is located within a region having a viewing distance of the proper range, the barrier panel may include transmitting regions 211 and 221, and blocking regions 212 and 222, as shown in FIG. 5A.

Figure 5B:
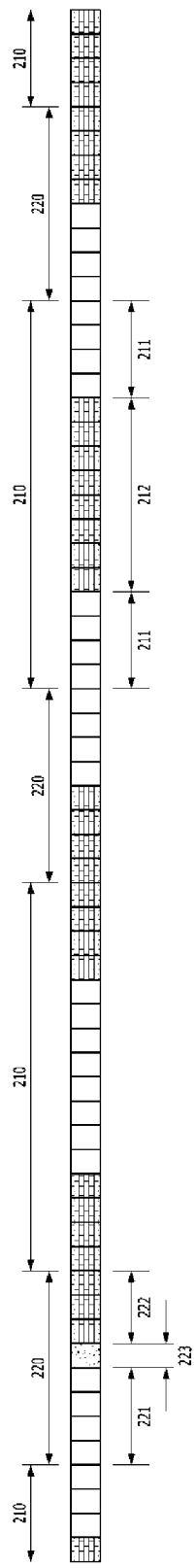

As shown in FIG. 5B, when the viewer moves further away from the region having the viewing distance of the proper range to a first far distance, the trigger region 220 farthest from the center of the barrier panel may include the channel 223 having the intermediate gray value, In the trigger region 220 farthest from the center of the barrier panel, the number of the channels consisting of the trigger transmitting region 221 may be larger than the number of the channels consisting of the trigger blocking region 222. For example, the trigger region 220 farthest from the center of the barrier panel may include the trigger transmitting region 221 having four channels and the trigger blocking region 222 having three channels. Thus, in the stereoscopic display device according to the embodiment of the present disclosure, the transmitting region 211 and 221 farthest from the center of the barrier panel may move toward the center of the barrier panel, when the viewer moves away from the region having the viewing distance of the proper range. Therefore, in the stereoscopic display device according to the embodiment of the present disclosure, the transmitting regions 211 and 221 of the barrier panel may move toward the center of the barrier panel by locating the channel 223 having the intermediate gray value within the trigger region 220, so that the stereoscopic image of good quality may provide to the viewer moving away from the region having the viewing distance of the proper range.

Figure 5C:
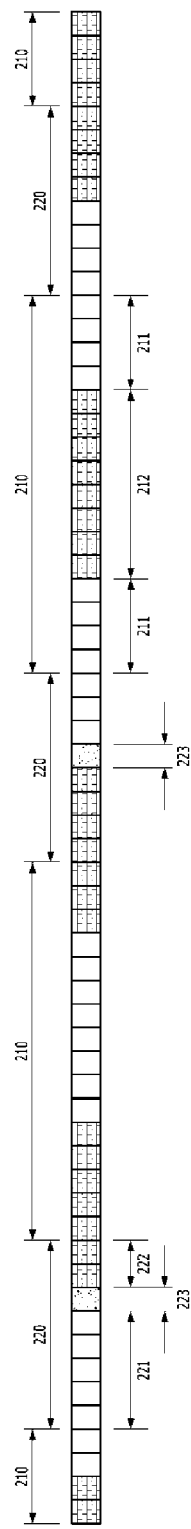

As shown in FIG. 5C, when the location of the viewer is even further away from the region having the viewing distance of the proper range at a second far distance, the trigger region 220 farthest from the center of the barrier panel and the trigger region 220 secondly far from the center of the barrier panel may include the channel 223 having the intermediate gray value. Thus, in the stereoscopic display device according to the embodiment of the present disclosure, the trigger region 220 farthest from the center of the barrier panel, and the barrier transmitting region 211 of the barrier panel 210 disposed between two trigger region 220 including the channel 223 having the intermediate gray value, may move toward the center of the barrier panel. Therefore, in the stereoscopic display device according to the embodiment of the present disclosure, the focus of the stereoscopic image may further move away from the display panel.

Figure 5D:
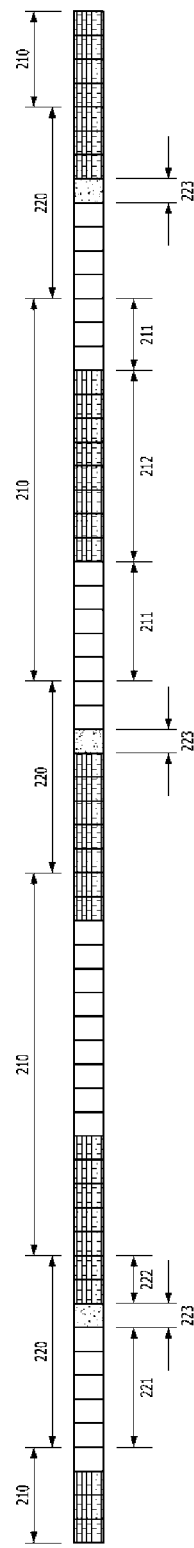

As shown in FIG. 5D, when the location of the viewer is still further away from the region having the viewing distance of the proper range at a third far distance, the trigger region 220 farthest from the center of the barrier panel, the trigger region 220 secondly far from the center of the barrier panel and the trigger region 220 third far from the center of the barrier panel may include the channel 223 having the intermediate gray value. Thus, in the stereoscopic display device according to the embodiment of the present disclosure, the focus of the stereoscopic image may further mover away from the display panel by further moving the transmitting regions 211 and 221 of the barrier panel toward the center of the barrier panel.

The stereoscopic display device according to the embodiment of the present disclosure is described that the channel 223 having the intermediate gray value is preferentially located within the trigger region 220 farthest from the center of the barrier panel, when the location of the viewer is out of the region having the viewing distance of the proper range. However, in the stereoscopic display device according to another embodiment of the present disclosure, the trigger region 220 closest to the center of the barrier panel includes preferentially the channel 223 having the intermediate gray value, so that a stereoscopic image of good quality is provided to the viewer located at a region being out of the proper range.

Accordingly, in the stereoscopic display device according to the embodiment of the present disclosure, a pair of the trigger regions 220 symmetrical with respect to the center of the barrier panel may include the channel 223 having the intermediate gray value according to the location of the viewer located at the region being out of the proper range, so that the size ratio between the trigger transmitting region 221 and the trigger blocking region 222 of the corresponding trigger region 220 may be adjusted, and the transmitting region 211 and 221 of the barrier panel may be moved. Thus, in the stereoscopic display device according to the embodiment of the present disclosure, the stereoscopic image of good quality may be provided to the viewer located at the region being out of the proper range. Also, in the stereoscopic display device according to the embodiment of the present disclosure, the channel 223 having the intermediate gray value may be disposed between the trigger transmitting region 221 and the trigger blocking region 222 of the corresponding trigger region 220, so that the signal applied to the channel having the intermediate gray value may not affect the channels within the barrier transmitting region 211 and the barrier blocking region 212 of adjacent barrier region 210. Thereby, in the stereoscopic display device according to the embodiment of the present disclosure, the stereoscopic image of good quality may be provided to the viewer located at the region being out of the proper range without affecting the gradation of the channel within the barrier region 210.

The stereoscopic display device according to the embodiment of the present disclosure may further comprise a structure for preventing reflection of external light. For example, the stereoscopic display device according to the embodiment of the present disclosure may further include a quarter-wave plate 800 between the display panel 100 and the front linear polarizer 710, as shown in FIG. 2A. The quarter-wave plate 800 may be in direct contact with the display panel 100 and the front linear polarizer 710.

Figure 6:
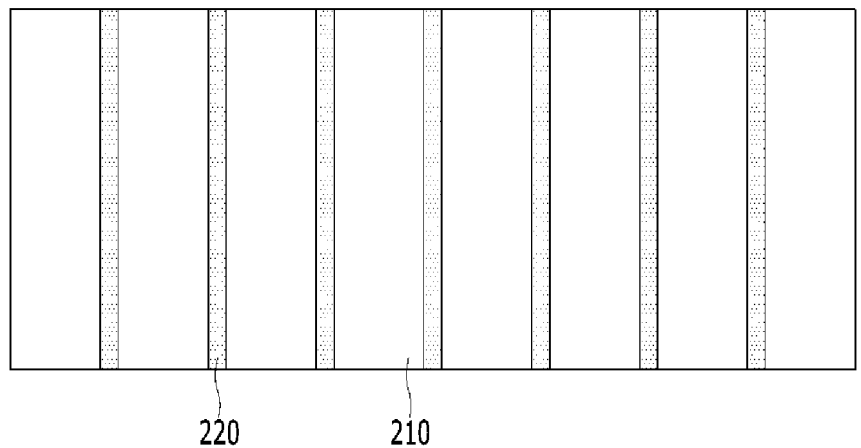
FIGS. 6 to 9 are views respectively showing a stereoscopic display device according to another embodiment of the present disclosure.

The stereoscopic display device according to the embodiment of the present disclosure is described that the width of the trigger regions 220 is a half of the width of the barrier regions 210. However, the stereoscopic display device according to another embodiment of the present disclosure may include the barrier panel 200 in which the width of the barrier regions 210 is at least twice the width of the trigger regions 220, as shown in FIG. 6. For example, in the stereoscopic display device according to another embodiment of the present disclosure, the trigger regions 220 having eight channels may be disposed between the barrier regions 210 having at least 17 channels. Thus, in the stereoscopic display device according to another embodiment of the present disclosure, the focus of the stereoscopic image provided to the viewer may be finely adjusted according to the distance between the location of the viewer and the region being out of the proper range.

Figure 7:
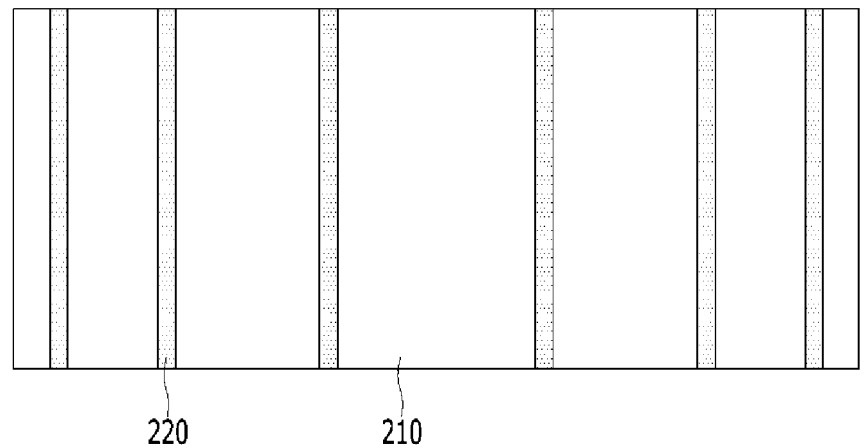

The stereoscopic display device according to the embodiment of the present disclosure is described that the barrier regions 210 have the same width. However, in the stereoscopic display device according to another embodiment of the present disclosure, the width of the barrier regions 210 may be reduced toward the outside of the barrier panel 200, as shown in FIG. 7. Thus, in the stereoscopic display device according to another embodiment of the present disclosure, the focus of the stereoscopic image provided to the viewer may be efficiently adjusted according to the location variation of the viewer.

Figure 8:
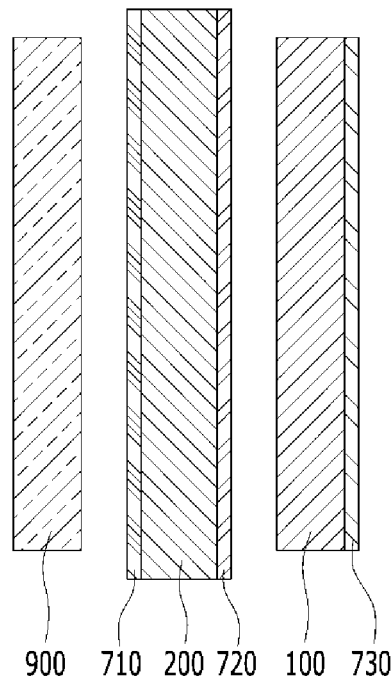

The stereoscopic display device according to the embodiment of the present disclosure is described that the barrier panel 200 is located on the display panel 100 including the light-emitting element 140. However, the stereoscopic display device according to another embodiment of the present disclosure may include the barrier panel 200 between the display panel 100 and the light-emitting element 900, as shown in FIG. 8. For example, the display panel 100 of the stereoscopic display device according to another embodiment of the present disclosure may be the liquid crystal panel. The light-emitting element 900 may serve as a back-light unit. The front linear polarizer 710 and the rear linear polarizer 720 may be in direct contact with the barrier panel 200. An image linear polarizer 730 may be disposed on the outer surface of the display panel 100. Thus, in the stereoscopic display device according to another embodiment of the present disclosure, the stereoscopic image of good quality may be provided to the viewer located at the region being out of the proper range without the relative location of the display panel 100 and the barrier panel 200.

Figure 9:
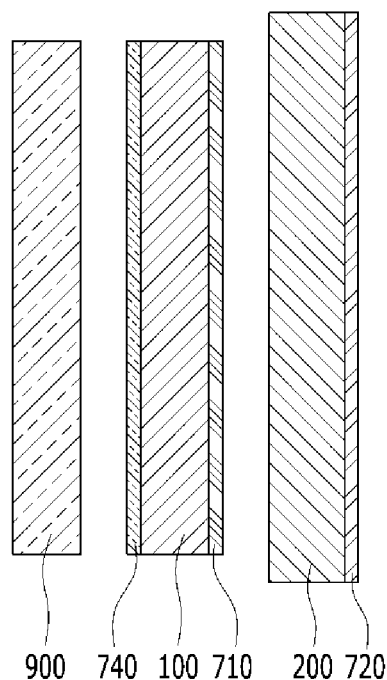

The stereoscopic display device according to another embodiment of the present disclosure is described that the barrier panel 200 is located between the light-emitting element 900 and the display panel 100. However, the stereoscopic display device according to further another embodiment of the present disclosure may include the display panel 100 between the light-emitting element 900 and the barrier panel 200, as shown in FIG. 9. An image linear polarizer 740 may be disposed between the light-emitting element 900 and the display panel 100. The image linear polarizer 730 and the front linear polarizer 710 may be in direct contact with the display panel 100. Thus, in the stereoscopic display device according to another embodiment of the present disclosure, the stereoscopic image of good quality may be provided to the viewer located at the region being out of the proper range in the display panel 100 and the barrier panel 200 at various positions.

In the result, the stereoscopic display device according to another embodiment of the present disclosure may prevent the generation of bright line and dark line due to the blocking regions and the transmitting regions of the barrier panel which are moved according to the viewing distance change by using the channels within the trigger regions. Thus, in the stereoscopic display device according to another embodiment of the present disclosure, the stereoscopic image of good quality may be provided to the viewer located at the region being out of the proper range. Thereby, in the stereoscopic display device according to another embodiment of the present disclosure, the region viewing the stereoscopic image may be increased without degrading the quality of the stereoscopic image.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stereoscopic display device, comprising:
a display driver driving a display panel;
a barrier panel on the display panel, the barrier panel including a plurality of channels;
a barrier driver controlling the channels of the barrier panel; and
a viewing distance detector detecting a viewing distance of a viewer,
wherein the barrier panel includes barrier regions and trigger regions between the barrier regions,
each of the barrier regions includes a barrier blocking region and a barrier transmitting region having the same size as the barrier blocking region,
each of the trigger regions includes a trigger blocking region and a trigger transmitting region, and
wherein a pair of the trigger regions symmetrical with respect to a center of the barrier panel includes channels having intermediate gray value between the trigger blocking region and the trigger transmitting region, when the viewing distance is out of the initial proper range.

2. The stereoscopic display device according to claim 1, wherein a size of each trigger region is smaller than a size of each barrier region.

3. The stereoscopic display device according to claim 1, wherein the number of the channels within the barrier blocking region is same as the number of the channels within the barrier transmitting region.

4. The stereoscopic display device according to claim 3, wherein the intermediate gray value is a gray value between a gray value of the barrier blocking region and a gray value of the barrier transmitting region.

5. The stereoscopic display device according to claim 3, wherein the number of the channels within each trigger region is a half of the number of the channels within each barrier region.

6. The stereoscopic display device according to claim 3, wherein the number of the channels within the trigger blocking region is different from the number of the channels within the trigger transmitting region.

7. The stereoscopic display device according to claim 6, wherein the trigger blocking region of each trigger region is in contact with the barrier blocking region of adjacent barrier region, and the trigger transmitting region of each trigger region is in contact with the barrier transmitting region of adjacent barrier region.

8. The stereoscopic display device according to claim 6, wherein the blocking region constituted of the barrier blocking region and the trigger blocking region, and the transmitting region constituted of the barrier transmitting region and the trigger transmitting region has a constant size.

9. The stereoscopic display device according to claim 1, wherein the trigger regions are disposed side by side with the barrier regions.

10. The stereoscopic display device according to claim 1, wherein the display panel includes a lower display substrate, a lower light-emitting electrode, a light-emitting layer, an upper light-emitting electrode and an upper display substrate, which are sequentially stacked.

11. The stereoscopic display device according to claim 10, wherein
the number of channels within the trigger blocking region is different from the number of the channels within the trigger transmitting region when the viewer is the initial proper distance from the display.

12. The stereoscopic display device according to claim 10, wherein
the number of channels within a pair of trigger blocking regions located at a symmetrical distance with respect to the center of the display is greater than the number of the channels within the trigger transmitting region when the viewer is the first close distance away from the display.

13. The stereoscopic display device according to claim 10, wherein
the number of the channels within a first pair of trigger blocking regions located at a symmetrical distance with respect to the center of the display is twice as great as the number of the channels within the trigger transmitting region when the viewer is the second close distance away from the display, closer than the first distance, and
the number of the channels within a second pair of trigger blocking regions located at a symmetrical distance with respect to the center of the display is greater than the number of the channels within the trigger transmitting region when the viewer is the second close distance away from the display, wherein the second pair of trigger regions is closer to the center of the display than the first pair of trigger regions.

14. The stereoscopic display device according to claim 10, wherein
the number of the channels within a pair of trigger blocking regions located at a symmetrical distance with respect to the center of the display is less than the number of channels within the trigger transmitting region when the viewer is the first far distance away from the display.

15. The stereoscopic display device according to claim 10, wherein
the number of the channels within a first pair of trigger blocking regions located at a symmetrical distance with respect to the center of the display is less than half the number of the channels within the trigger transmitting region when the viewer is the second, far distance away from the display, farther than the first far distance, and
the number of the channels within a second pair of trigger blocking regions located at a symmetrical distance with respect to the center of the display is less than the number of the channels within the trigger transmitting region when the viewer is the second close distance away from the display, wherein the second pair of trigger regions is closer to the center of the display than the first pair of trigger regions.

16. A method of operating a stereoscopic display device, comprising:
driving a display panel with a display driver circuit to output a video image;
passing the video image through a barrier panel on the display panel, the barrier panel including a plurality of channels, the barrier panel including barrier regions and trigger regions between the barrier regions, each of the barrier regions includes a barrier blocking region and a barrier transmitting region having the same size as the barrier blocking region, each of the trigger regions includes a trigger blocking region and a trigger transmitting region;
controlling the channels of the barrier panel with a barrier driver circuit; and
detecting a viewing distance of a viewer watching the video; and
placing at least one channel having an intermediate gray value when the viewing distance is out of the initial proper range in a pair of the trigger regions located symmetrical with respect to a center of the barrier panel,
wherein the channel having intermediate gray value is disposed between the trigger blocking region and the trigger transmitting region.

17. The method of claim 16 further comprising:
sensing that the viewer is a first, close distance from the display;
placing only a single pair of channels having an intermediate gray value when the viewing distance is at the first close distance that is out of the initial proper range for viewing, each channel in the pair being in trigger regions located symmetrical with respect to a center of the barrier panel.

18. The method of claim 17 further comprising:
sensing that the viewer is a second, close distance from the display, the second close distance being closer than the first close distance;
placing at least two pairs of channels having an intermediate gray value when the viewing distance is at the second close distance that is out of the initial proper range for viewing, each channel in each pair being in trigger regions located symmetrical with respect to a center of the barrier panel.

19. The method of claim 18 further comprising:
sensing that the viewer is a third, close distance from the display, the third close distance being closer than the second close distance;
placing at least three pairs of channels having an intermediate gray value when the viewing distance is at the third close distance that is out of the initial proper range for viewing, each channel in each pair being in trigger regions located symmetrical with respect to a center of the barrier panel.

20. The method of claim 19 wherein each channel of the first pair of the three pairs is located a first, far distance from the center of the barrier panel, adjacent to an edge of the panel, at a symmetrical location with respect to each other; each channel of the second pair of the three pairs is located a second distance from the center of the barrier panel, closer than the first far distance, at a symmetrical location with respect to each other; and each channel of the third pair of the three pairs is located a third distance from the center of the barrier panel, closer than the second distance, at a symmetrical location with respect to each other.

* * * * *